A. GREBE.
VARIABLE POWER TELESCOPE.
APPLICATION FILED NOV. 14, 1912.
1,167,164.
Patented Jan. 4, 1916.
2 SHEETS—SHEET 1.
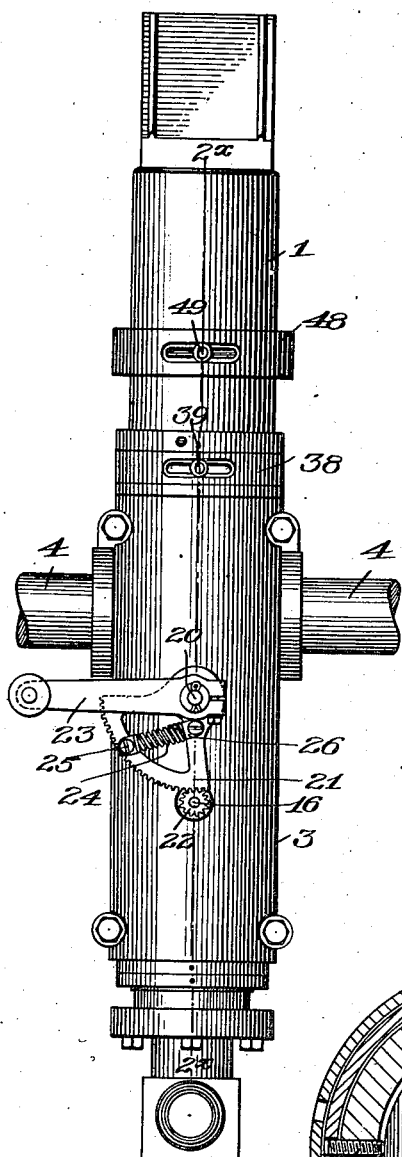
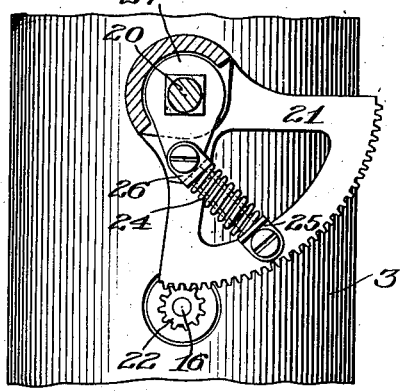
Inventor
Albert Grebe

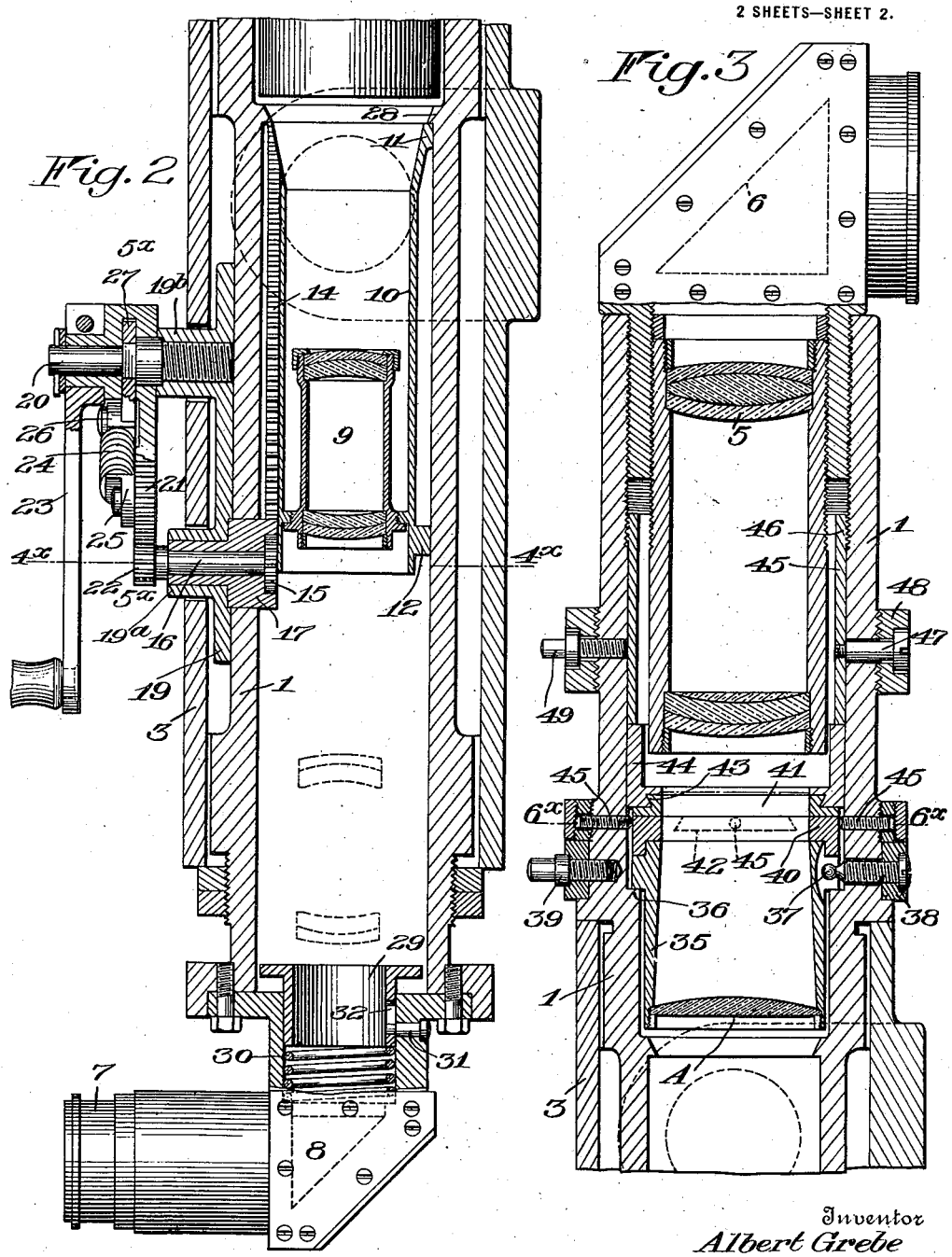

UNITED STATES PATENT OFFICE.

ALBERT GREBE, OF ROCHESTER, NEW YORK, ASSIGNOR TO BAUSCH & LOMB OPTICAL COMPANY, OF ROCHESTER, NEW YORK, A CORPORATION OF NEW YORK.

VARIABLE-POWER TELESCOPE.

1,167,164.

Specification of Letters Patent. Patented Jan. 4, 1916.

Application filed November 14, 1912. Serial No. 731,284.

*To all whom it may concern:*

Be it known that I, ALBERT GREBE, of Rochester, in the county of Monroe and State of New York, have invented certain new and useful Improvements in Variable-Power Telescopes; and I do hereby declare the following to be a full, clear, and exact description of the same, reference being had to the accompanying drawings, forming a part of this specification, and to the reference-numerals marked thereon.

My present invention has for its object to provide a telescope adapted particularly to be used for the purpose of sighting heavy ordnance, such as ships' cannon, in which the power of the instrument or magnification of the image, may be varied. To this end the invention also contemplates a simple and durable form of mounting and operating mechanism for adjusting the erecting system of lenses of a telescope.

In this direction the invention has for its further object to provide an improved means for clamping the cross hair adjusting devices, the parts mentioned being especially adapted to hold their positions and withstand the shocks incident to the firing of the gun on which the instrument may be mounted.

To these and other ends the invention consists in certain improvements and combinations of parts, all as will be hereinafter more fully described, the novel features being pointed out in the claims at the end of the specification.

In the drawings: Figure 1 is a side elevation of a telescope or gun-sight showing parts, constructed in accordance with my invention applied thereto; Fig. 2 is an enlarged cross sectional view taken on the line $2^x-2^x$ of Fig. 1, showing the mechanism for adjusting the erecting lens system; Fig. 3 is a similar view disclosing the arrangement of the adjustable parts of the cross hair support and the locking devices for securing these parts in place; Fig. 4 is a horizontal sectional view taken on the line $4^x-4^x$ of Fig. 2; Fig. 5 is a detail view taken on the line $5^x-5^x$ of Fig. 2, and Fig. 6 is a detail cross sectional view taken on the line $6^x-6^x$ of Fig. 3.

Similar reference numerals throughout the several figures indicate the same parts.

In illustrating my present invention, I have shown an optical instrument or telescope of the character adapted for use as a gun-sight with cannon such as are used either on battleships or for coast defense, comprising a tubular casing 1, detachably secured in a jacket or clamps 3, provided with the trunnions 4, by means of which the instrument may be supported on a suitable portion of the gun carriage or mount. The casing 1 customarily stands in a vertical, or substantially vertical position, it being provided at its upper end with a suitable objective lens 5, with which coöperates a prismatic reflector 6, so disposed as to take in a horizontal view and direct the light rays from the horizontal field into the objective lens. At the other or lower end of the casing 1, is the eyepiece 7 containing a complementary system of lenses, the pencil of rays from the objective lens 5 being directed into the eyepiece by another prismatic reflector 8. Interposed between the objective and eyepiece lenses is an erecting system of lenses indicated by 9, having suitable optical properties whereby when in one position, as shown in full lines in Fig. 2, they will give a high power magnification, such for instance as an enlargement of 8 diameters and when in another position, as shown in dotted lines in said figure, they will give a relative low power magnification, for example, a magnification of only 2 diameters.

The adjustable erecting lens system 9 is supported in a carrier or mounting 10 in the form of a tube having at its upper and lower ends the guide rings 11 and 12 respectively engaging the walls of the tube 1. At one side of the latter and extending longitudinally thereof are two spaced ribs 13, one of which is provided on its inner face with the rack teeth 14 which coöperate with a pinion 15 on the inner end of an arbor 16. The latter is carried in a journal box 17, the inner end of which projects through the casing 1 into the space between the ribs 13, where one edge is cut away to permit the pinion 15 to mesh with the rack teeth 14, while the other edge forms a projection 18, as shown in Fig. 4, against which the face of one of the ribs 13 engages, this arrangement of parts being provided to prevent the rotation of the carrier or mounting 10 within the casing 1.

On the exterior of the casing of the telescope is a reinforcing plate 19, having the bosses 19ª and 19ᵇ which project outwardly through apertures in the jacket 3, the first mentioned boss serving as a support for the bearing block 17, while the latter carries the rigid post 20. This post is the axis or pivot on which the operating member, employed for shifting the position of the erecting system of lenses, is mounted. In the present instance, the operating member comprises a segmental gear 21 meshing with the pinion 22 on the outer end of the arbor 16 and oscillated by a crank arm 23.

In conjunction with the operating devices employed for shifting the interior lenses, there is provided means for impelling them toward and holding them in their uppermost and lowermost positions, or at the extremes of their movement in opposite directions, said means being yieldable to enable the operator to quickly shift, or reverse, the position of the lenses. In carrying out this feature of my invention, I have shown, as one means of accomplishing the desired results, a spring 24 compressible between an abutment 25 carried on the segmental gear 21 and an abutment 26 supported on an arm 27 rigid on the post 20. The abutments 25 and 26 are pivotally connected to the respective parts on which they are mounted and in order to keep them in proper alinement they are provided with telescoping guides arranged within the coils of the spring 24 as shown in Fig. 5. The point of attachment of the abutment 25 to the gear 21, and the initial compression provided in the spring 24 is such that when the operating member is in the position shown in Fig. 1, the mounting 10 will occupy the position shown in Fig. 2 and be held in engagement with the uppermost stop 28. If desired these parts may be arranged to hold the carrier in its uppermost position against the stop 28 with considerable pressure and the spring caused to exert a greater force at this time than when the position of the lens system is reversed. When the mounting and the lens system is in its lowermost position the force of gravity will assist in retaining these parts in this position.

Owing to the combined weight of the movable lens system and its mounting and also because of the fact that the spring 24 exerts an equal tendency to impel the mounting 10 toward the limit of its downward movement, there is provided at the lower end of the casing 1 a yielding stop or check. In the present instance, this stop comprises the tubular sleeve 29 backed by the spring 30 and adapted to contact with the lower end of the mounting 10. The sleeve is held in place and its longitudinal movement is limited by a pin 31, the inner end of which rests in an elongated slot 32.

A particular advantage is derived in arranging the parts in the manner shown, especially in a gunsight having the vertically extending barrel or casing and the horizontally disposed eyepiece, as it will be observed that the operating devices by which the power of the telescope is altered, are arranged above the eyepiece and rotate in a plane transverse to its axis. In using the instrument the gunsighter usually has one eye bandaged and during action he is not supposed to remove his other eye from the eyepiece of the instrument. With his right hand he controls the adjusting mechanism, by means of which the gun is pointed. For these reasons the arrangement of the parts shown is advantageous, as they are above the head of the gunsighter, within easy reach of his left hand and the full operation is effected by a quarter rotation by the crank arm 23. It is not necessary, however, for the operator to actually rotate the crank the full distance, as the spring 24 will impel the operating mechanism to the limit of its movement in either direction upon rotation of the crank "over center."

A further feature of my invention relates to means for locking the cross hair adjusting devices in position within the telescope. In the instrument shown, the cross hairs are mounted at the point A. They are supported on the ring or carrier 35 resting upon a shoulder 36 formed upon the interior of the casing 1 and rotatably adjustable by means of a finger 37 projecting exteriorly of the casing and carried on the ring 38 which is clamped by a screw 39. The carrier 35 is adjustable transversely of the casing 1 by means of two cross slides 40 and 41 controlled by dovetailed guides, as indicated at 42. The upper laterally movable ring 41 also has the dovetailed guides 43 securing it to the ring 44 which is slidingly fitted within the casing 1. The transverse adjustment of the carrier 35, afforded by the cross guides 42 and 43 is effected by four screws 45 arranged as shown in Fig. 6. The play, or freedom of action, which it is necessary to provide in order to permit the transverse and rotary adjustment of the cross hairs renders these parts described liable to displacement and to obviate this difficulty I provide within the casing 1, a clamping member or sleeve 45, threaded at its upper end at 46 to the wall of the casing 1, and at its lower end engaging the ring 44. This sleeve 45 is rotatably adjustable by means of pin 47 carried in the rotatable ring 48 rigidly secured in adjusted position by the screw 49. The ring 48 being arranged on the exterior of the casing corresponds to the adjusting ring 38, controlling the rotary adjustment of the cross hair carrier 35, consequently when it is found desirable to shift the latter for any reason whatever, the clamp 45 may be released, from the exterior of the casing 1, by unlocking and rotating the ring 48.

A telescope embodying the features of my invention is adapted to be used with the adjustable system of lenses located first in the low power position when a relatively large field is disclosed. A particular point in such field is then selected as the sighting mark when the shift of the lenses being made to the high power position a greater magnification of the selected point is attained with a consequent lessening of the area of the field under observation.

I claim as my invention:

1. In an optical instrument, the combination with a tube having objective and eyepiece lenses, an erecting system of lenses and a carrier for the latter movable in the tube, of an operating member arranged exteriorly of the tube and movable alternately in opposite directions, driving connections between said member and carrier for shifting the latter and means for impelling the carrier to the limit of its movement in both directions.

2. In an optical instrument, the combination with a tube having objective and eyepiece lenses, and an erecting system of lenses, of a carrier for the latter guided in the tube, a shiftable operating member arranged exteriorly of the tube and operating mechanism between said member and carrier comprising a tension device which operates to impel the carrier to the limit of its longitudinal movement in both directions.

3. In an optical instrument, the combination with a tube having objective and eyepiece lenses, and an erecting system of lenses, of a carrier for the latter guided in the tube, a shiftable operating member arranged exteriorly to swing a partial revolution in opposite directions, operating mechanism for effecting the longitudinal adjustment of the carrier in opposite directions upon movement of the operating member and means coöperating with said mechanism to impel the carrier toward the limits of its movement when moved past a central point in either direction and also serving to yieldingly hold the carrier at the extremes of its movement.

4. In a telescope, the combination with a tube, fitted with objective and eyepiece lenses, a system of erecting lenses and a movable carrier therefor, guided in the tube, having a gear rack, of a segmental gear mounted exteriorly of the tube, a bearing block at the side of the tube supporting the segmental gear, an arbor also extending through said block and provided upon its inner and outer ends with pinions coöperating respectively with the rack and the segmental gear.

5. In a variable power telescope, the combination with a tube having objective and eyepiece lenses and a system of erecting lenses, of a mounting for the latter movable longitudinally in said tube, an oscillatory operating member on the latter and connections between it and said mounting for shifting the latter, a spring connected to said operating member and to the tube and serving to rotate the member to the limit of its movement after it has passed the center of movement when traveling in one direction or the other.

6. The combination with a telescope tube having objective, eyepiece and erecting lenses, and a mounting for the latter movable longitudinally in the tube having a gear rack, of a reinforcement applied to said tube carrying a post, a bearing block extending through the tube and reinforcement, an arbor journaled therein and provided with gear pinions, an oscillatory gear segment pivoted on the post and coöperating with one of said pinions, and means for oscillating said gear segment.

7. The combination with a telescope tube having objective eyepiece and erecting lenses, and a mounting for the latter movable longitudinally in the tube having a gear rack, of an arbor provided with pinions arranged internally and externally of said tube, the former coöperating with the rack and a stationary post projecting from the tube having a rigid finger thereon, a gear segment journaled on the post and coöperating with the external pinion, an extensible spring co-acting with the gear segment and said finger to rotate the segment when it is adjusted past its center of movement in either direction and a handle for shifting the gear segments.

8. In a variable power optical instrument, the combination with a tubular casing fitted with an objective and an eyepiece, of a system of erecting lenses interposed between them, a mounting therefor, means for moving it longitudinally in the casing, and stops for limiting its movement in opposite directions, one of which is yieldingly supported.

9. In a gun sight, the combination with a vertically disposed tubular casing fitted with an objective and an eyepiece, of a system of erecting lenses, a mount therefor guided in the casing, means for moving it upwardly and downwardly and a yielding stop arranged beneath said mount and adapted to limit its downward movement.

10. In a variable power optical instrument, the combination with a tubular casing fitted with an objective and an eyepiece, of a system of erecting lenses interposed between them, a mounting therefor, means for moving it longitudinally in the casing, a sleeve yieldingly supported to move axially of the casing and disposed to engage one end of the said mounting for checking its movement in one direction.

ALBERT GREBE.

Witnesses:
WILLIAM G. WOODWORTH,
HENRY C. THON.